United States Patent Office 3,218,141
Patented Nov. 16, 1965

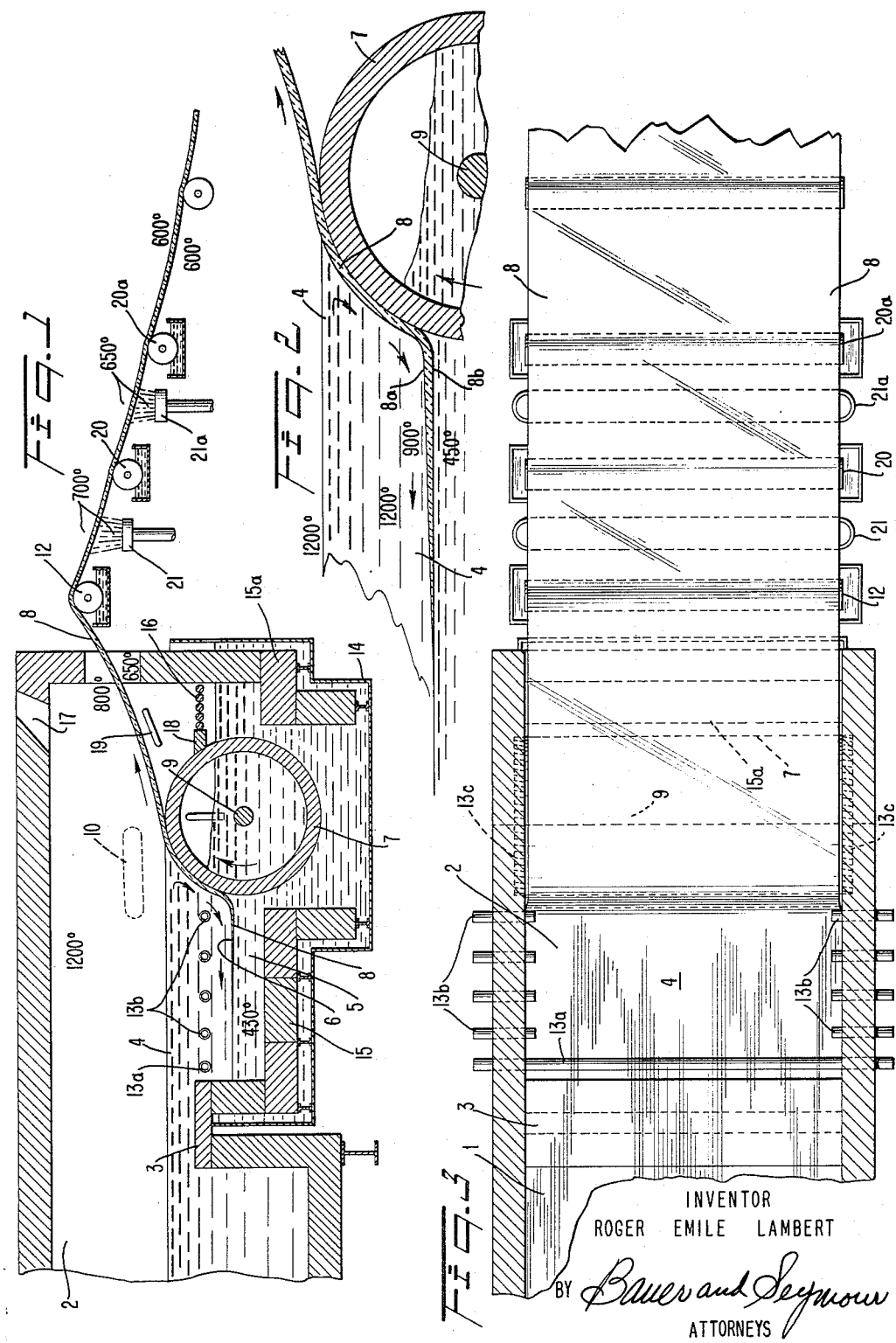

3,218,141
METHOD OF AND APPARATUS FOR MAKING THERMOPLASTIC SHEET MATERIAL
Roger Emile Lambert, Paris, France, assignor to Compagnie de Saint-Gobain, Neuilly-sur-Seine, France
Filed Dec. 13, 1960, Ser. No. 75,516
Claims priority, application France, Dec. 15, 1959, 813,050
13 Claims. (Cl. 65—65)

This invention relates to a method of continuously producing at a high rate of production, sheets of glass or other thermoplastic material of substantially uniform thickness and substantially without surface defect.

It is an object of this invention to make thermoplastic sheet, particularly glass sheet, by a novel process and a novel apparatus, in which a pellicle is formed on the surface of a fluid body of glass by heat exchange and the pellicle is then thickened by the deposit of more glass, the glass being, thus, transformed, by the progressive deposition of additional increments, from a pellicle to a body of useful thickness, and being removed from contact with the fluid, formative body only after the predetermined thickness has been attained. In the method, the formative body of glass is molten and fluid, heat exchange is applied to one part of the fluid body of molten glass, which is thus cooled until a layer of glass loses its fluidity and forms a pellicle. Then, by further heat exchange, additional increments of glass are deposited on the pellicle until the desired thickness has been obtained and the object, becoming self-sustaining, can be separated from the formative body of molten glass by mechanical means.

Another object is to fire polish an object of glass without the use of fire, by forming the object in contact with a body of fluid glass at fire polishing temperature, and moving the body through the molten glass until a fire polish is given to it. In the formation of sheet glass it is an object to form the sheet continuously, fire polish it, and to protect the surface against contact with mechanical transportation means, such as rollers, by providing a film of water vapor between the glass and the roller.

The process is particularly adapted to the manufacture of glass sheet and it will be described in connection with that manufacture.

According to the invention a mass of molten glass in fluid condition is disposed upon a bath of molten material inert to the glass, this molten material having a density higher than that of the glass, so that the glass floats upon it, and being immiscible with the glass so that they do not commingle, this molten bath being kept at a temperature which causes the contiguous surface of the glass to form a pellicle, this pellicle being moved endwise while still in contact with the fluid glass and being thickened by additional increments which are formed by progressive heat exchange between the supporting bath, the pellicle, and the glass bath, until it reaches the desired thickness, after which it is withdrawn from contact with the formative bath and cooled.

There are many other novel concepts of method and apparatus which contribute to the invention and it will be referred to in the specification and the claims. The sheet of glass which is produced by the present invention is of substantially uniform thickness and its method of formation, by accretion from a forming fluid mass, imparts an excellent polish to its surface. This polish is fully comparable, or superior, to a fire polish and obviates the use of fire polishing. In effect, the formative body of glass is employed, itself, to impart a fire polish.

The supporting bath may be composed of a molten metal such as tin, lead, or aluminum or an alloy of these metals, or it may be made of molten salt which does not react with glass. In any case, the supporting bath should not react with the glass at the temperature employed, in order to preserve the high polish which is imparted to the glass by the liquid on which it rests. The metal bath is a good conductor of heat, of low viscosity, homogeneous in temperature at least in the transverse direction perpendicular to the motion of the sheet, and the thickness of the sheet formed is most uniform and its removal is made easy by the mobility of the molten baths between which it is drawn. The thickness of the glass sheet may be regulated in several ways: Assuming a bath of selected, fixed length, the thickness of the sheet can be regulated by the speed at which it is drawn over the bath; assuming a fixed speed of the sheet, the thickness can be regulated by the length of the bath with which the sheet makes contact; the difference in thickness can also be affected in both foregoing cases by the difference in temperature between the supporting metal bath and the glass supported by it.

There is described hereinafter, as an example, a form of the invention will adapted to clearly use the novel process.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIGURE 1 is a vertical, longitudinal section through a preferred form of apparatus;

FIGURE 2 is a diagram showing the formation of the sheet; and

FIGURE 3 is a plan view, illustrating certain details of construction.

Referring to the numerals in the drawing, the glass comes from furnace 1, for example at 1200°, flows in a compartment 2 over a dam 3 and rests upon a bath of molten metal 5, for example molten tin, which is contained within a tank 14 of highly refractory metal which remains solid at the temperature of the operation. The temperature of the glass which flows onto the molten metal may be at an average of 1200° C. and the temperature of the molten metal may be from about 500° C. These figures are not limitations but are representative of good working conditions. When the glass comes into contact with the relatively low temperature metal it congeals and forms a polished pellicle 6 which extends between the bottom of the fluid glass 4 and the top of the fluid metal 5. This pellicle is sufficiently solid to permit it to be withdrawn by mechanical means. The thickness of the pellicle increases as it is drawn through the tank, acquiring accretions of glass which increase its thickness as the contiguous glass is cooled by heat exchange. During the travel of the sheet through the tank the temperature of the fluid glass above the sheet is quite high and the upper face 8a of the sheet receives a high polish which is fully comparable to an excellent fire polish. The lower face of the sheet, because of its contact with the relatively cool metal receives a polish comparable with those of the metal bath and the temperature of this sheet is such that it is not marred by the mechanical means, for instance a wheel to be hereinafter discussed, which removes the sheet from the bath.

In the apparatus represented in the drawings, the removal of the sheet of glass and its motion through the bath is obtained by means of a roller 7 which is submerged in the bath and is rotated about an axis 9. The roller is driven by any satisfactory means which imparts uniform motion. The lower face 8b of the sheet 8 comes in contact with the outer surface of the roller 7 but it is sufficiently hardened to be entrained by the roller and not to be marred by surface defects which the roller may have. At the same time, the sheet 8 maintains a sufficient plasticity to engage itself with the surface of the roller. The roller 7 may, for example, be made of steel, graphite, or cast iron.

The congealed glass continues to cool during its contact with the roller 7, particularly on its lower face. The sheet of glass thus formed retains its flatness due to a slight pull to which it is subjected during its passage from the cylindrical roller 7 to the roller 12. If need be, supplemental traction may be applied by the roller 12 to improve the flatness of the sheet before passing it into the annealing oven.

When the sheet is first drawn from the bath onto the surface of the roller a metallic screen may be lowered into the bath, caught under the leading edge of the sheet, to which the sheet will attach itself and be thus drawn onto the surface of the roller 7, after which the screen may be withdrawn.

If desired a cooler 10 may be placed above the fluid glass 4. In the form of the invention shown a temperature of 1200° is maintained above the tank containing the superimposed baths of glass and metal, thus maintaining the upper surface of the glass at about that temperature. The temperature of the glass is considerably lower at the bottom due to the contact with the cooler metal and may, just above the formed sheet, be in the neighborhood of 900° C. The sheet of glass thus has a temperature of about 450 to about 500° on its lower face and a temperature of about 900° on its upper face and the heat exchange through the sheet of glass is sufficient to cause the congealing of the bottom of the glass bath and its accretion on the sheet. Temperature controlling means may be mounted in the metal bath and above the glass, or in the glass, if desired, to heat or to cool it whereby to obtain the most favorable degree of efficiency in the operation.

In order to allow the glass sheet to be moved easily over the metal bath, means are provided to prevent the attachment of the edges of the sheet to the walls of the furnace. This is indicated in FIGURE 3 wherein there are placed along the sides of the tank 14 heating elements which keep the glass at the edges of the sheet fluid.

As shown in FIGURE 3 there is disclosed a means for electrically heating the sides of tank 4 by passage of the current either between the electrodes 13a and 13b or between the electrodes and the bath. Electrode 13a is made of a refractory metal such as molybdenum or of graphite through which is passed an electrical current. Electrodes 13b may exchange current between them and with the metal bath. Very close to the roller 7 and to obviate the holding back of the sheet in course of extraction by the walls, said walls are heated by an independant heating means, for example by a metallic plating 13c heated by the passage of an electrical current.

The metal bath is contained in a metal tank 14 which is provided with blocks 15, 15a of refractory material of the type which is used in the manufacture of glass melting tanks and which are fixed in position to prevent them from moving and so arranged as to permit the molten metal to circulate freely between and around them. The cylindrical roller 7 is hollow and the molten metal is enabled to circulate inside it. The circulation of metal and arrangement of blocks tends to maintain uniform temperature. The blocks act to some extent as isolation and they may be made of silica-alumina refractories, or of alumina or even of graphite. In order to provide for the cooling of the metal bath and for maintenance of its temperature despite calories from the hotter glass, one way insert an appropriate cooling means, for instance by circulating water through the tubes extending through the metal or by circulating water in contact with the exterior of the tank 14. One may also withdraw a stream of the metal from the tank by means of a pump, pass it through an external heat exchange and return it to the tank.

The apparatus and process of this invention also permit, in addition to the foregoing advantages, the reduction of the oxidation of the metal bath to a minimum because this bath is entirely covered prior to the roller 7 with liquid glass making an airtight seal so that the only contacts with atmosphere are outside the blocks or after the roller in areas where the bath is not in movement and where it is easy to provide protecting means preventing oxidation. Those areas of liquid which are thus exposed may be covered with screens 16 of graphite or the like, which float on the metal and protect it from oxidation. These screens may be graphite screens or molten salts. On the other hand, it is also possible to control the atmosphere above the glass in all or a part of tank 2 by means of a burner 17 which provides a reducing atmosphere. A scraper 18 in contact with roller 7 may be shaped to conform to the curvature of said roller 7 and may glide on it so as to keep its surface clean.

In enlarged scale, compared to FIGURE 1, there is shown in FIGURE 2 the formation of the pellicle and its accretion by deposits of congealing glass with an indication of the temperatures which are frequently found during successful operation. The glass is introduced into the tank at 1200° with a viscosity of $3 \times 10^2$ poises. At 1000°, at which glass is generally worked, the viscosity is $10^4$ poises but it is advisable that the layer of glass floating on the bath should be somewhat hotter particularly if one wishes to draw off very thin sheets. The temperature of the lower face 8b is that of the metal bath, for instance 450°, and that of the upper face, due to heat exchange through the sheet with the metal, is about 900°, which is about that temperature which is used to produce a fire polish. Thus, the upper face of the glass receives a fire polish without being subjected to fire.

After leaving the roller 7 a temperature control 19, for instance a cooling conduit, may be arranged below the glass and in proximity to its lower surface to further cool the surface and thus to protect it against the mechanical transporting means, rollers 12 and 20, which receive it. The production of a difference in temperature between the upper and lower faces of 800 to 650° is important. These temperatures are equalized by means of burners 21, 21a which conform the temperature of the lower face to that of the upper at each stage of the cooling. Either burners or coolers may be used as desired and depending upon the particular character of an installation. In order to prevent the glass from being marred by the transport rollers these rollers may be dipped in water as indicated at 12 and 20 so that the water is vaporized by the heating of the sheet and the film of vapor thus produced interposes between the rollers and the glass and protects the glass against marking by the rollers so that the smooth surface imparted by the metal bath is retained.

In a modified form of the invention the glass sheet is formed in the same way but the sheet after formation is withdrawn from the bath vertically in a known way using the standard apparatus for such withdrawal. Under these circumstances, a cooler is preferably placed in the metal beneath the root of the sheet and vigorous cooling is carried out in order to impart to the glass a condition of tenacity sufficient to sustain the weight of the sheet and the contact of the elevating means.

This novel process in which a sheet of thermoplastic material is formed between incompatible fluids, one of which is thermohardening, can also be applied to other materials, organic as well as inorganic, due attention being paid to the selection of baths of different temperature which permit heat exchange sufficient to congeal the surface of the thermoplastic fluid into a non-fluid pellicle.

As example for ordinary sheet glass the tank has a length of about 3 to 4 meters, the thickness of the final sheet is from about 5 to 6 m./m. and the speed of the drawing sheet is from about 2 to 3 meters/minute.

As many apparently widely different embodiments of the present invention may be made without departing from the spirit and scope thereof, it is to be understood that the invention is not limited to the specific embodiments.

What is claimed is:

1. A method of forming a sheet of glass that comprises floating a molten bath of glass at fire polishing temperature upon a cooler, denser liquid bath inert to and immiscible with the glass, maintaining the portions of the glass bath and the denser bath which are in contiguous relation at temperatures which produce a congealing of molten glass as a pellicle on the bottom of the glass bath, and a progressive thickening of the sheet as the sheet is drawn along the denser bath, drawing said pellicle of glass along the surface of the denser bath and thereby thickening the glass sheet by accretion, drawing the glass sheet off from between the superimposed baths as it attains a selected thickness, and cooling the sheet.

2. A method of forming a homogeneous sheet of glass of selected thickness which comprises floating a bath of molten glass, the temperature of which is hundreds of degrees hotter at its top than at its bottom, on a body of denser, cooler molten metal which is at a temperature enough lower than the bottom of the glass to congeal a pellicular layer on the bottom of the molten glass, moving the pellicular layer of glass along the surface of the molten metal until the glass sheet, thus formed, acquires its selected thickness by the cooling, coherence, and accretion of contiguous molten glass to its surface, withdrawing the formed sheet from between the bath of molten glass and the molten metal, and cooling the sheet.

3. A method according to claim 2 in which the molten glass above the forming sheet is at fire polishing temperature.

4. A method according to claim 2 in which the sheet withdrawn is moistened with water and transported on rollers, the vaporization of the water forming a protection between the glass and the roller.

5. A method according to claim 2 in which the sheet is withdrawn horizontally and is heated on its lower face to maintain the same rate of cooling on its two faces.

6. A method according to claim 2 in which the metal bath is at about 450–500° C. and the hot glass in the bath is at about 1200° C. at a level removed from the lower bath.

7. A method according to claim 2 in which the glass has different temperatures on opposite faces as it leaves the bath and is differentially heated to restore equilibrium of temperature during cooling.

8. Apparatus for forming sheet glass comprising a first tank adapted to contain a molten metal, a second tank adapted to contain molten glass, means to deliver a bath of molten glass from the second tank to the top of the molten metal, means to maintain metal and glass at temperatures at which the portion of the glass bath contiguous to the metal forms a pellicular sheet and the bath of molten glass thereabove remains fluid, means to draw the sheet through the first tank, whereby to increase its thickness, means to remove the sheet from between the bath of molten glass and the molten metal, and means to cool the sheet comprising a roller immersed in the metal and the glass having its outer surface aligned to receive the sheet and lift it out of the bath, means to turn the roller, and means to cool the withdrawn sheet.

9. Apparatus according to claim 8 in which the first tank is of metal and contains blocks of refractory materials interposed between the glass and walls of the metal tank, said blocks being spaced from the walls and arranged to permit the metal to flow into the space adjacent the wall.

10. Apparatus according to claim 8 in which the first tank is provided with means to maintain the temperature of the metal contiguous to the glass at a degree at which glass congeals and with means to maintain the average temperature of the upper levels of the superimposed glass at a degree at which glass does not congeal.

11. Apparatus according to claim 8 in which the first tank is provided with means to maintain the space above the glass at about 1200° C. and with means to maintain the molten metal at a temperature which produces a temperature in the molten glass circa 900° C. just above the formed sheet.

12. Apparatus according to claim 8 in which the roller is hollow and receives molten metal therewithin.

13. Apparatus according to claim 8 in which the walls of the tank are provided with heaters at the edges of the sheet.

References Cited by the Examiner

UNITED STATES PATENTS

| | | | |
|---|---|---|---|
| 710,357 | 9/1902 | Heal. | |
| 1,305,286 | 6/1919 | Hopkinson | 49—3 |
| 1,358,390 | 11/1920 | Owens | 65—25 |
| 1,564,240 | 12/1925 | Hitchcock. | |
| 1,735,595 | 11/1929 | Blair | 49—3 X |
| 1,920,118 | 7/1933 | Walsh et al. | 49—17 |
| 2,387,886 | 10/1945 | Devol | 65—25 |
| 2,417,094 | 3/1947 | Spinasse | 49—17 |
| 2,607,168 | 8/1952 | Drake | 49—17 |
| 2,968,892 | 1/1961 | Pilkington | 65—65 |
| 2,968,893 | 1/1961 | Pilkington | 65—65 |
| 3,127,261 | 3/1964 | Long | 65—83 |

FOREIGN PATENTS

| | | |
|---|---|---|
| 567,339 | 11/1958 | Belgium. |
| 1,159,183 | 2/1958 | France. |
| 769,129 | 2/1957 | Great Britain. |
| 769,692 | 3/1957 | Great Britain. |

DONALL H. SYLVESTER, *Primary Examiner.*

ARTHUR P. KENT, *Examiner.*